United States Patent
Sipilä et al.

(10) Patent No.: US 10,877,170 B2
(45) Date of Patent: Dec. 29, 2020

(54) VESSEL MONITORING BASED ON DIRECTIONALLY CAPTURED AMBIENT SOUNDS

(71) Applicant: KONGSBERG MARITIME FINLAND OY, Rauma (FI)

(72) Inventors: Sauli Sipilä, Turku (FI); Mark Callaway, Helsinki (FI); Mikko Mertovaara, Helsinki (FI); Lasse Lindell, Helsinki (FI)

(73) Assignee: KONGSBERG MARITIME FINLAND OY, Rauma (FI)

( * ) Notice: Subject to any disclaimer, the term of this patent is extended or adjusted under 35 U.S.C. 154(b) by 0 days.

(21) Appl. No.: 16/486,357

(22) PCT Filed: Feb. 14, 2018

(86) PCT No.: PCT/FI2018/050106
§ 371 (c)(1),
(2) Date: Aug. 15, 2019

(87) PCT Pub. No.: WO2018/150092
PCT Pub. Date: Aug. 23, 2018

(65) Prior Publication Data
US 2020/0003916 A1 Jan. 2, 2020

(30) Foreign Application Priority Data
Feb. 15, 2017 (FI) ........................................ 20175129

(51) Int. Cl.
*H04R 1/02* (2006.01)
*G01V 1/00* (2006.01)
(Continued)

(52) U.S. Cl.
CPC .............. *G01V 1/001* (2013.01); *B63B 49/00* (2013.01); *G05D 1/005* (2013.01); *G05D 1/0022* (2013.01); *G05D 1/0206* (2013.01)

(58) Field of Classification Search
CPC ...... G01V 1/001; B63B 49/00; G05D 1/0022; G05D 1/005; G05D 1/0206; G05D 1/0011;
(Continued)

(56) References Cited

U.S. PATENT DOCUMENTS 6,288,973 B1 * 9/2001 Joynes ...................... G01S 5/30
367/118
9,518,830 B1 * 12/2016 Breed .................... G08G 1/162
(Continued)

FOREIGN PATENT DOCUMENTS

AU 2013211192 A1 8/2014
DE 4412194 A1 * 10/1995 ............. G01V 1/001
(Continued)

OTHER PUBLICATIONS

"Remote and Autonomous Ships—The Next Steps"; AAWA-Position Paper; Jokioinen, Esa; Rolls Royce; Jan. 9, 2017.
(Continued)

*Primary Examiner* — An T Nguyen
(74) *Attorney, Agent, or Firm* — Ware, Fressola, Maguire & Barber LLP (57) ABSTRACT

The invention allows vessel monitoring based on directionally captured ambient sounds. A remote operation centre for monitoring a vessel comprises a set of speakers and a controller. The controller comprises an input unit configured to receive at least one microphone signal from at least one on-board directional microphone of an array of on-board directional microphones. The controller further comprises a processing unit configured to analyze the received at least (Continued)

one microphone signal and to generate speaker-specific directional output signals based on the analysis. The controller further comprises an output unit configured to send the generated speaker-specific directional output signals to respective one or more speakers of the set of speakers.

20 Claims, 4 Drawing Sheets

(51) Int. Cl.
  *B63B 49/00* (2006.01)
  *G05D 1/00* (2006.01)
  *G05D 1/02* (2020.01)
(58) Field of Classification Search
  CPC ... G08G 3/00; G08G 3/02; H04R 1/44; H04R 29/005; H04S 3/00; H03G 3/20
  See application file for complete search history.

(56) References Cited

U.S. PATENT DOCUMENTS

| | | | | |
|---|---|---|---|---|
| 2004/0059477 | A1* | 3/2004 | Kish | G08G 3/00 701/21 |
| 2009/0187297 | A1* | 7/2009 | Kish | G05B 23/0213 701/21 |
| 2010/0067330 | A1* | 3/2010 | Collier | G01S 15/89 367/88 |
| 2013/0039527 | A1* | 2/2013 | Jensen | H04R 1/24 381/387 |
| 2013/0148471 | A1* | 6/2013 | Brown | G01S 7/629 367/88 |
| 2013/0311548 | A1 | 11/2013 | Huang et al. | |
| 2015/0098588 | A1* | 4/2015 | Kim | H03G 3/20 381/102 |
| 2015/0166163 | A1* | 6/2015 | Longson | G01S 5/0009 340/984 |
| 2016/0040968 | A1 | 2/2016 | Jeng | |
| 2016/0217692 | A1* | 7/2016 | Lee | G08G 3/02 |
| 2016/0221660 | A1 | 8/2016 | McCummins et al. | |
| 2016/0235046 | A1* | 8/2016 | Etienne-Cummings | G01S 7/521 |
| 2017/0153117 | A1* | 6/2017 | Kawase | H04N 21/4722 |
| 2020/0003916 | A1* | 1/2020 | Sipila | B63B 49/00 |

FOREIGN PATENT DOCUMENTS

| | | |
|---|---|---|
| JP | S62169069 A | 7/1987 |
| JP | 2001272248 A | 10/2001 |
| KR | 20070025363 A | 3/2007 |
| KR | 101399562 B1 * | 5/2014 |
| KR | 20150145590 A | 12/2015 |

OTHER PUBLICATIONS

Automated Detection of Fishing Vessels Using Smart Hydrophones on an Underwater Coastal Glider, Wood, Mark et al., Jun. 22-27, 2014, (pp. 1313-1322).
Localization of Small Surface Vessels Through Acoustic Data Fusion of Two Tetrahedral Arrays of Hydrophones; Science and Technology Organization Centre for Maritime Research and Experimentation; Tesei, Alessandra et al.; Jul. 2012.
English language translation and Abstract of KR20150145590.
English language translation and Abstract of KR20070025363A.
English language Abstract of 2001272248.
English language Abstract of JPS62169069A.

* cited by examiner

VESSEL MONITORING BASED ON DIRECTIONALLY CAPTURED AMBIENT SOUNDS

BACKGROUND OF THE INVENTION

Field of the Invention

The invention relates to watercraft. In particular, the invention relates to vessel monitoring based on directionally captured ambient sounds.

Description of the Related Art

Unmanned marine vessels are vessels that sail at sea without any crew on-board. Such vessels can be controlled remotely by a human or autonomously with automation technologies. However, the operation of these vessels may require human intervention in certain situations. The unmanned marine vessels may be controlled by human operators working at a remote operation centre which is usually located on shore. In order to enable this, a variety of sensors and cameras are arranged at the marine vessel to detect and observe the ship status, operation of the various systems of the marine vessel, fault situations, the behavior of the marine vessel and its cargo, motions of the marine vessel, the environment of the marine vessel, waves, weather conditions, other sea traffic for avoidance of collisions, etc. This kind of information is gathered, processed and transferred to the remote operation centre wherein the operator can remotely monitor and control the marine vessel and solve possible fault conditions.

It is desirable that the operator can have as good as possible situational awareness of the vessel to assist in decision-making. It is desirable that the remote operation centre may be able to reproduce the sound field on the ship bridge in order to allow the operator to have a better sense of virtual presence on the ship. Furthermore, it is desirable that the remote operation centre may be able to reproduce the sound environment outside the bridge, on the deck near the bridge or on top of the bridge to make it possible to listen to the sounds of other vessels in poor visibility in order to assist in identifying unrecognized moving objects. Furthermore, it is desirable that the remote operation centre may be able to attract the attention of the operator to a dynamic obstacle (e.g. another vessel) that the operator seems not to have observed.

SUMMARY OF THE INVENTION

An embodiment of a remote operation centre for monitoring a vessel comprises a set of speakers and a controller. The controller comprises an input unit that is configured to receive at least one microphone signal from at least one on-board directional microphone of an array of on-board directional microphones. The controller further comprises a processing unit that is configured to analyze the received at least one microphone signal and to generate speaker-specific directional output signals based on the analysis. The controller further comprises an output unit that is configured to send the generated speaker-specific directional output signals to respective one or more speakers of the set of speakers.

In an embodiment, alternatively or in addition to the above described embodiments, the processing unit is further configured to perform the analyzing of the received at least one microphone signal by determining the direction of a sound represented by the received at least one microphone signal.

In an embodiment, alternatively or in addition to the above described embodiments, the processing unit is further configured to perform the analyzing of the received at least one microphone signal by identifying a source object of a sound represented by the received at least one microphone signal.

In an embodiment, alternatively or in addition to the above-described embodiments, the source object comprises another vessel, and the identifying of the source object comprises at least one of identifying the other vessel and identifying a vessel type of the other vessel.

In an embodiment, alternatively or in addition to the above-described embodiments, the processing unit is communicatively connected to a database comprising identification information on predetermined source objects, and the processing unit is further configured to perform the identifying of the source object by utilizing the identification information.

In an embodiment, alternatively or in addition to the above-described embodiments, the identification information comprises information on at least one of: vessel propulsion types, vessel hull forms, vessel caused wave patterns, vessel engine sounds, or vessel horn sounds.

In an embodiment, alternatively or in addition to the above-described embodiments, a sound represented by the received at least one microphone signal comprises ambient sound captured from the surroundings of the vessel.

In an embodiment, alternatively or in addition to the above-described embodiments, the processing unit is further configured to generate, based on the analysis, a visual indicator signal indicating a source object of a sound represented by the received at least one microphone signal.

In an embodiment, alternatively or in addition to the above-described embodiments, the visual indicator signal further indicates a direction of movement of the source object.

In an embodiment, alternatively or in addition to the above-described embodiments, the remote operation centre further comprises a display arrangement, and the output unit is further configured to send the generated visual indicator signal to the display arrangement.

In an embodiment, alternatively or in addition to the above-described embodiments, the input unit is further configured to receive one or more radio communication channel signals of a vessel radio communication system, and the output unit is further configured to send the one or more radio communication channel signals as directional radio output signals to one or more speakers of the set of speakers such that each radio communication channel is reproduced from a different direction.

In an embodiment, alternatively or in addition to the above-described embodiments, the processing unit is further configured to determine a priority level for each signal to be sent to the one or more speakers of the set of speakers and control the volume of the signals based on the determined priority levels.

An embodiment of a sound system for monitoring a vessel comprises an array of on-board directional microphones and the remote operation centre according to any of the above-described embodiments.

In an embodiment, alternatively or in addition to the above-described embodiments, at least a portion of the array of the on-board directional microphones is arranged under the sea level.

In an embodiment, alternatively or in addition to the above-described embodiments, at least a portion of the array of the on-board directional microphones is arranged above the sea level.

In an embodiment, alternatively or in addition to the above-described embodiments, the sound system further comprises a radio communication system.

The invention allows vessel monitoring based on directionally captured ambient sounds. At least some of the embodiments allow enhancing vessel operator's situational awareness of the vessel in order to assist in decision-making. At least some of the embodiments allow the remote operation centre to reproduce the sound field on the ship bridge in order to allow the operator to have a better sense of virtual presence on the ship. At least some of the embodiments allow the remote operation centre to reproduce the sound environment outside the bridge, on the deck near the bridge or on top of the bridge to make it possible for the operator to listen to the sounds of other vessels in poor visibility in order to assist in identifying unrecognized moving objects. At least some of the embodiments allow the remote operation centre to attract the attention of the operator to a dynamic obstacle (e.g. another vessel) that the operator seems not to have observed.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

Like reference numerals are used to designate like parts in the accompanying drawings.

DETAILED DESCRIPTION OF THE INVENTION

Reference will now be made in detail to embodiments of the present invention, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
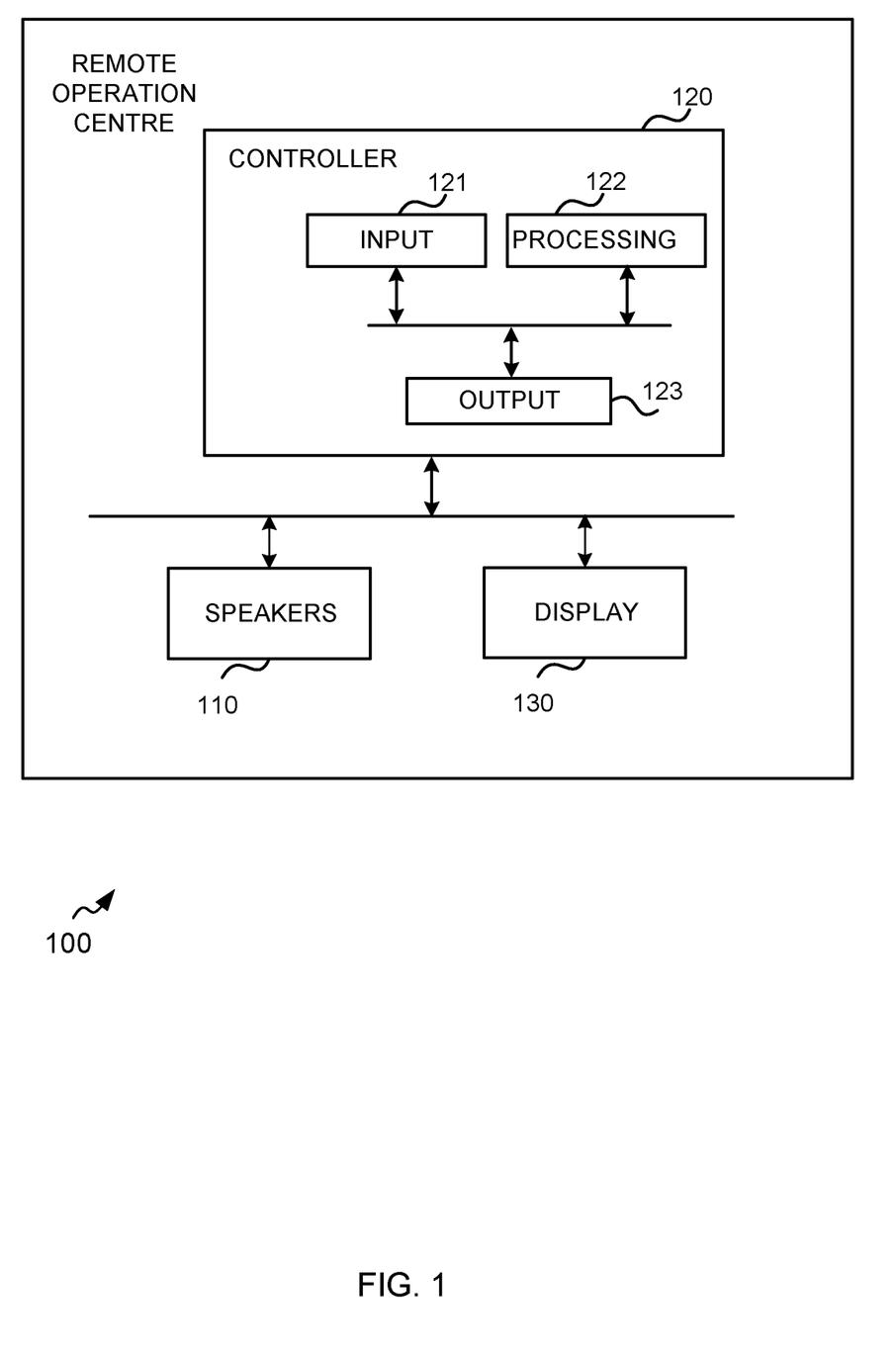
FIG. 1 is a block diagram of a remote operation centre for monitoring a vessel in accordance with an example embodiment.
Figure 2:
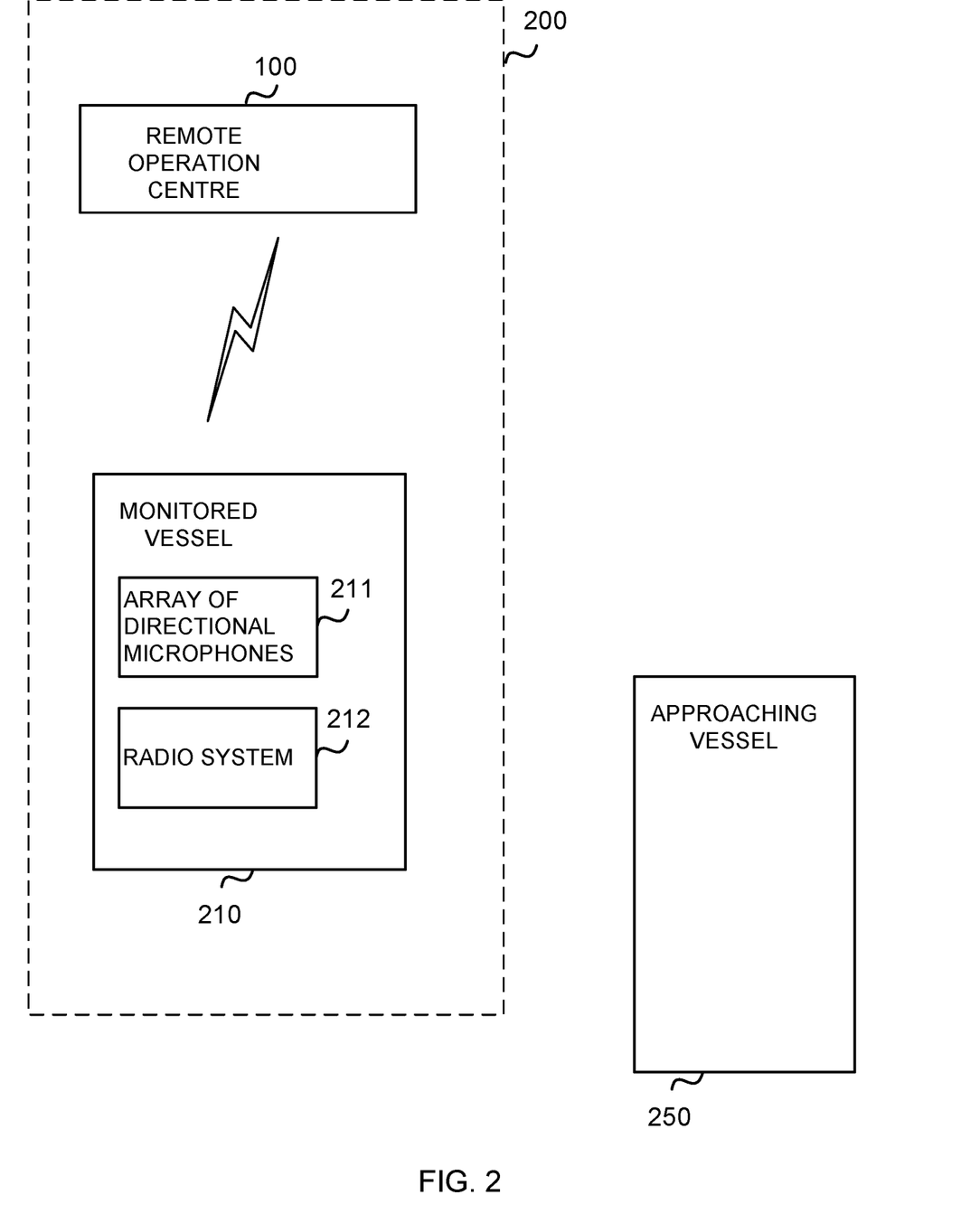
FIG. 2 is a block diagram of a system incorporating a remote operation centre in accordance with an example embodiment.
Figure 4:
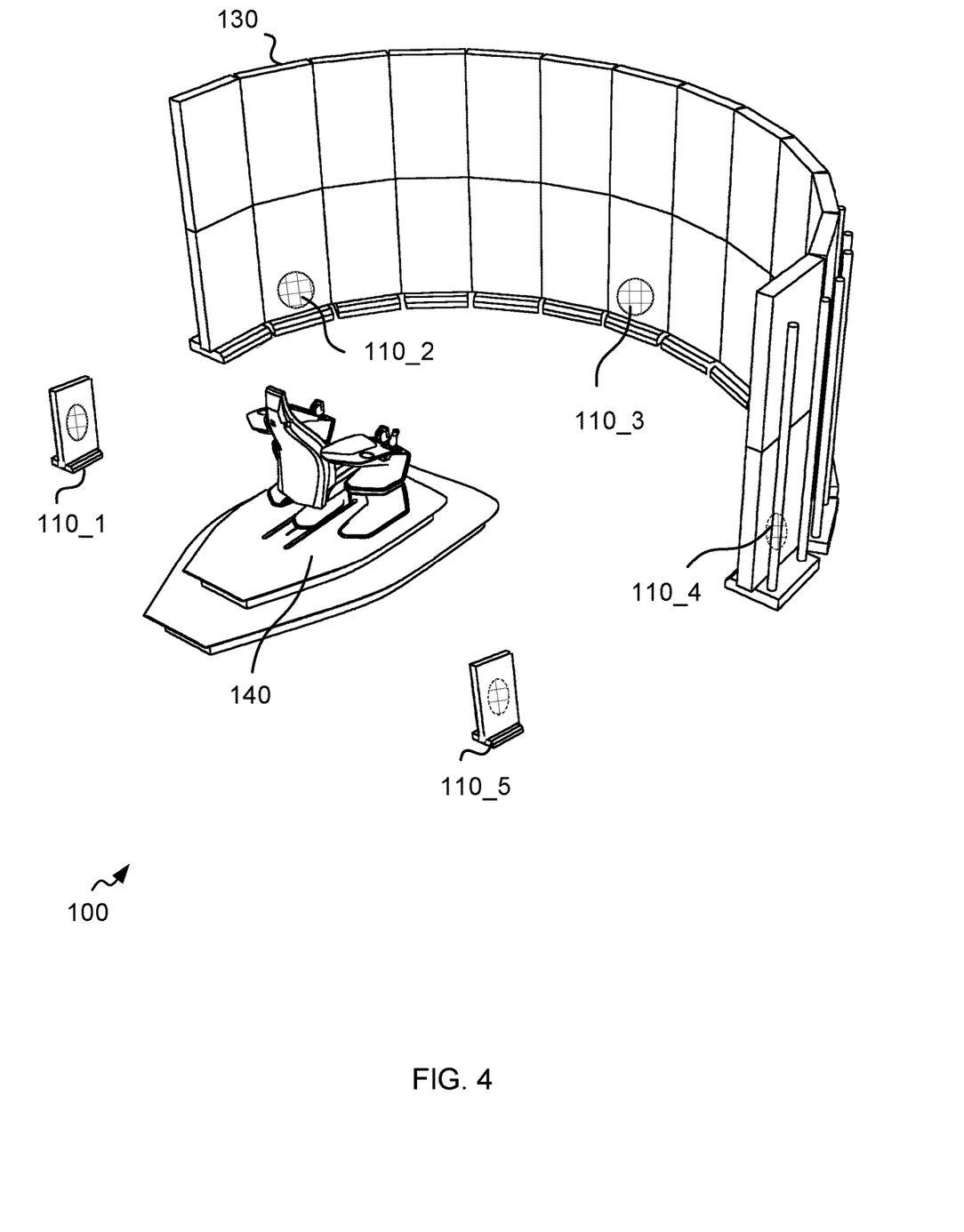
FIG. 4 is an axonometric view of a remote operation centre for monitoring a vessel in accordance with an example embodiment.

FIG. 1, FIG. 2 and FIG. 4 illustrate a remote operation centre 100 for monitoring a vessel 210. Herein, a vessel refers to any craft designed for transportation on and/or under water that has a propulsive or thrust capability provided by one or more thrust devices (including e.g. shaft-line propellers, tunnel thrusters, azimuthing thrusters, waterjets, and/or rudders, or the like). Examples of a vessel include but are not limited to a tug ship, a ferry, and the like. The vessel may be any suitable surface vessel, for example a marine vessel. The vessel may be an unmanned vessel, i.e. the vessel may be autonomous or have an autopilot feature.

The monitored vessel 210 comprises an array 211 of on-board directional microphones. Coherent combination of microphone signals may be used for directional sound capture. At least some of the array 211 of the on-board directional microphones may be arranged under the sea level. Additionally and/or alternatively, at least some of the array 211 of the on-board directional microphones may be arranged above the sea level. The monitored vessel 210 may further comprise a radio communication system 212. The monitored vessel 210 may further comprise e.g. position sensors, heading sensors, wind sensors, attitude sensors, and/or inertial sensors, or the like (not illustrated).

The remote operation centre 100 may be located remote from the monitored vessel 210 on a shore or the like. In other examples, the remote operation centre 100 may be located on a deck or some other location in the monitored vessel 210 itself without departing from the scope of the present disclosure. It should be noted that at least some of the elements described below may not be mandatory and thus some may be omitted in certain embodiments.

The remote operation centre 100 may further comprise a display arrangement 130 and an operator chair 140. The operator chair 140 may be fixed to the floor. The operator chair 140 may be arranged to face towards the display arrangement 130. In one example, the display arrangement 130 may be configured as a vertical half-cylinder formation to provide a 180-degrees panoramic view for the operator sitting in the operator chair 140. In one example, as illustrated in FIG. 4, the display arrangement 130 may comprise a plurality of flat displays arranged in the half-cylinder formation. The operator chair 140 may be arranged symmetrically in relation to a vertical symmetry axis of the display arrangement 130, i.e. the centre of the radius of the half-cylinder formation of the main display arrangement 130 may lie on the symmetry axis.

The remote operation centre 100 further comprises a set of speakers 110 and a controller 120. As illustrated in FIG. 4, the set of speakers 110 may comprise e.g. five speakers 110_1, 110_2, 110_3, 110_4 and 110_5. The speakers may be arranged in any suitable formation that allows reproduction of directional sound. For example, the speakers may be arranged at substantially equal distances from the operator chair 140. In an embodiment, the speakers may be arranged in a substantially circular formation around the operator chair 140.

The controller 120 comprises an input unit 121 that is configured to receive at least one microphone signal from at least one on-board directional microphone of an array 211 of on-board directional microphones. Herein, a sound represented by the received at least one microphone signal may comprise ambient sound captured from the surroundings of the monitored vessel 210. Such ambient sounds may include e.g. sounds from waves, wind, rain, hales and/or other vessels. Reproduction of ambient sounds may enhance the situational awareness of a human operator at the remote operation centre 100 with regards to the monitored vessel 210.

The controller 120 further comprises a processing unit 122 that is configured to analyze the received at least one microphone signal and to generate speaker-specific directional output signals based on the analysis.

The processing unit 122 may be further configured to perform the analyzing of the received at least one microphone signal by determining the direction of a sound represented by the received at least one microphone signal.

Additionally and/or alternatively, the processing unit 122 may be further configured to perform the analyzing of the received at least one microphone signal by identifying a source object of a sound represented by the received at least one microphone signal. The source object may comprise e.g. another vessel (such as another vessel 250 approaching the monitored vessel 210, as shown in FIG. 2), and the identifying of the source object may comprise identifying the other vessel 250 and/or identifying a vessel type of the other vessel 250.

The processing unit 122 may be communicatively connected to a database (not illustrated) that comprises identification information on predetermined source objects. Accordingly, the processing unit 122 may be further configured to perform the identifying of the source object by utilizing the identification information stored in the database. Such identification information may comprise e.g. information on vessel propulsion types, vessel hull forms, vessel caused wave patterns, vessel engine sounds, and/or vessel horn sounds. The database may comprise e.g. a sound recognition data bank, and the identification information may comprise e.g. sound samples. For example, sound captured with under the sea level microphones may be used together with the stored sound samples to identify e.g. various propulsion types, vessel hull forms and/or vessel caused wave patterns. Sound captured with above the sea level microphones may be used together with the stored sound samples to identify e.g. various vessel engine sounds and/or horn sounds.

The controller 120 further comprises an output unit 123 that is configured to send the generated speaker-specific directional output signals to respective one or more speakers of the set of speakers 110. The generated speaker-specific directional output signals may be sent to the respective one or more speakers of the set of speakers 110 such that, when the various ambient sounds are reproduced by the speakers, the directional sound field experienced by the operator (e.g. sitting at the operator chair 140) may be substantially similar to the sound field at the bridge of the monitored vessel 210, for example, thereby enhancing situational awareness of the operator.

The processing unit 122 may be further configured to generate, based on the analysis, a visual or graphic indicator signal indicating a source object of a sound represented by the received at least one microphone signal. The visual indicator signal may further indicate a direction of movement of the source object. The output unit 123 may be further configured to send the generated visual indicator signal to the display arrangement 130. For example, sound sources may be displayed on a map shown on the display arrangement 130 or on video screen(s) with different colored dots or other forms or symbols.

The input unit 121 may be further configured to receive one or more radio communication channel signals of the vessel radio communication system 212. The output unit 123 may be further configured to send the one or more radio communication channel signals as directional radio output signals to one or more speakers of the set 110 of speakers such that each radio communication channel is reproduced from a different direction. The vessel radio communication system 212 may comprise e.g. a VHF (very high frequency) radio communication system. For example, one radio channel may be used for an emergency channel, another radio channel may be used for inter-ship communication, another radio channel may be used for communicating with the harbor. Reproducing each channel from a different direction allows the human operator at the remote operation centre 100 to easily identify each channel based on the direction of the sound. In an embodiment, the speakers 110 in the remote operation centre 100 may be used so that one actual speaker is allocated to each radio channel. Alternatively, virtual loudspeakers may be created anywhere in the sound field with suitable surround sound processing methods.

The processing unit 122 may be further configured to determine a priority level for each signal to be sent to the one or more speakers of the set 100 of speakers and control the volume of the signals based on the determined priority levels. For example, ambient sounds may be automatically lowered when radio communication takes place. This may depend on the level of the ambient noise, e.g. such that high noise may be attenuated more than a low hum. In an embodiment, more attenuation may be used when the operator pushes a send button to speak to a microphone.

Figure 3:
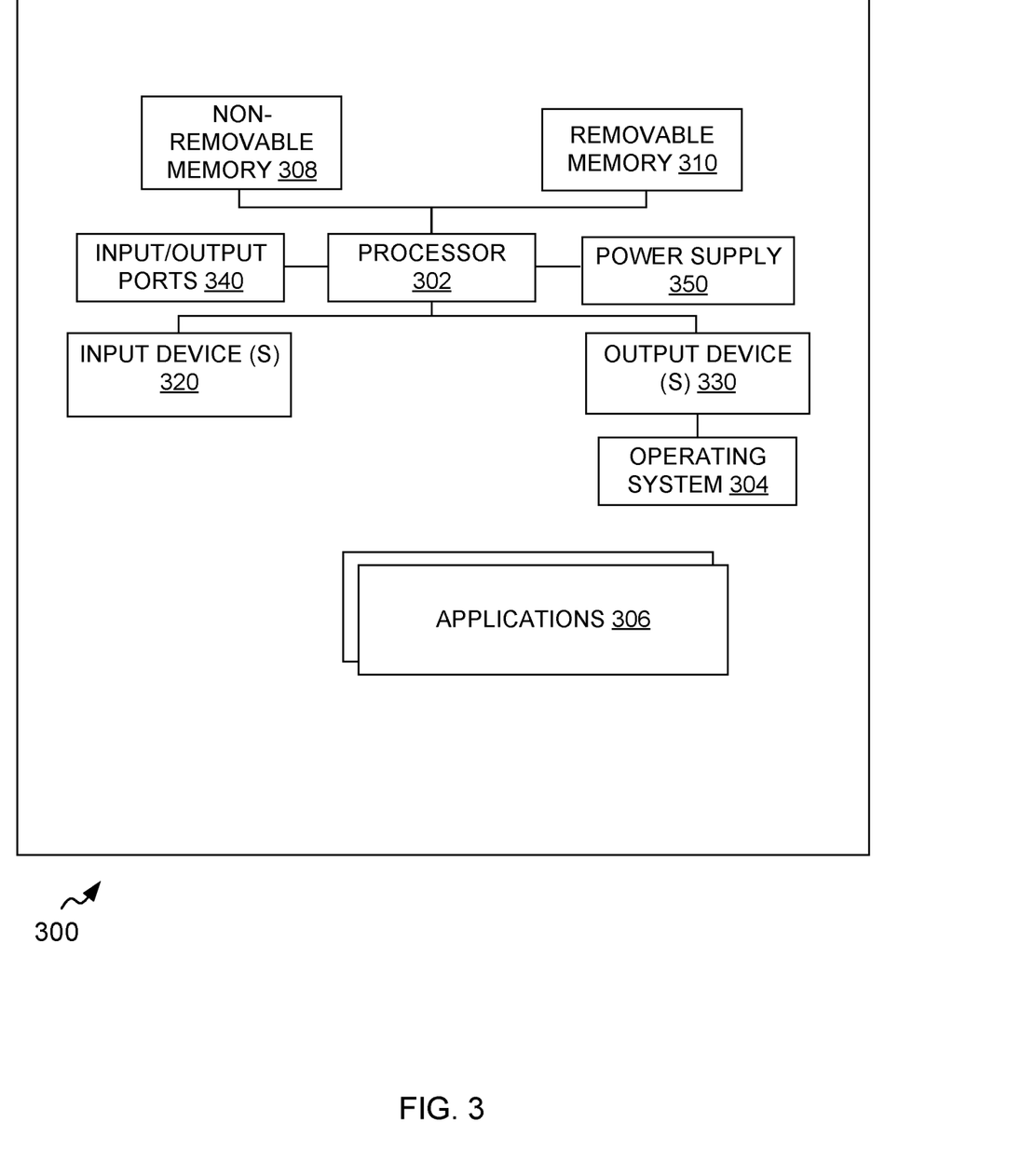
FIG. 3 illustrates a block diagram of an electronic apparatus capable of implementing example embodiments described herein.

FIG. 3 is a schematic block diagram of an electronic apparatus or device 300 capable of implementing embodiments of the techniques described herein. For example, the electronic apparatus 300 may be used to implement the controller 120 of FIG. 1. It should be understood that the electronic device 300 as illustrated and hereinafter described is merely illustrative of one type of apparatus or an electronic device and should not be taken to limit the scope of the embodiments. As such, it should be appreciated that at least some of the components described below in connection with the electronic device 300 may be optional and thus in an example embodiment may include more, less or different components than those described in connection with the example embodiment of FIG. 3. As such, among other examples, the electronic device 300 could be any computer devices, such as any suitable servers, workstations, personal computers, laptop computers, and the like.

The illustrated electronic device 300 includes a controller or a processor 302 (i.e.—a signal processor, microprocessor, ASIC, or other control and processing logic circuitry) for performing such tasks as signal coding, data processing, input/output processing, power control, and/or other functions. An operating system 304 controls the allocation and usage of the components of the electronic device 300 and support for one or more application programs 306. The application programs 306 can include vessel control and operation related applications, or any other applications.

The illustrated electronic device 300 includes one or more memory components, for example, a non-removable memory 308 and/or removable memory 310. The non-removable memory 308 may include RAM, ROM, flash memory, a hard disk, or other well-known memory storage technologies. The removable memory 310 may include flash memory (such as one or more removable flash drives) or smart cards. The one or more memory components may be used for storing data and/or code for running the operating system 304 and the applications 306. Example of data may include text, images, sound files, image data, video data, or other data sets to be sent to and/or received from one or more network servers or other devices via one or more wired or wireless networks.

The electronic device 300 can support one or more input devices 320 and one or more output devices 330. The electronic device 300 can further include one or more input/output ports 340, and a power supply 350. The illustrated components are not required or all-inclusive, as any of the components shown can be deleted and other components can be added.

The exemplary embodiments can include, for example, any suitable servers, workstations, personal computers, laptop computers, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more satellite communications networks, wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, microcontrollers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been de-scribed in connection with a number of exemplary embodiments, and implementations, the present inventions are not so limited, but rather cover various modifications, and equivalent arrangements, which fall within the purview of prospective claims.

The invention claimed is:

1. A remote operation centre (100) for monitoring a vessel, characterized in that the remote operation centre (100) comprises:
    a set of speakers (110) having one or more speakers; and
    a controller (120), comprising:
        an input unit (121), configured to receive at least one microphone signal from at least one on-board directional microphone of an array of on-board directional microphones;
        a processing unit (122), configured to analyze the at least one microphone signal received and to generate speaker-specific directional output signals based on the analysis; and
        an output unit (123), configured to send the speaker-specific directional output signals generated to the one or more speakers of the set of speakers (110).

2. The remote operation centre (100) according to claim 1, wherein the processing unit (122) is further configured to perform the analyzing of the at least one microphone signal received by determining the direction of a sound represented by the at least one microphone signal received.

3. The remote operation centre (100) according to claim 1, wherein the processing unit (122) is further configured to perform the analyzing of the at least one microphone signal received by identifying a source object of a sound represented by the at least one microphone signal received.

4. The remote operation centre (100) according to claim 3, wherein the source object comprises another vessel, and the identifying of the source object comprises at least one of identifying the other vessel and identifying a vessel type of the other vessel.

5. The remote operation centre (100) according to claim 3, wherein the processing unit (122) is communicatively connected to a database comprising identification information on predetermined source objects, and the processing unit (122) is further configured to perform the identifying of the source object by utilizing the identification information.

6. The remote operation centre (100) according to claim 5, wherein the identification information comprises information on at least one of: vessel propulsion types, vessel hull forms, vessel caused wave patterns, vessel engine sounds, or vessel horn sounds.

7. The remote operation centre (100) according to claim 1, wherein a sound represented by the at least one microphone signal received comprises ambient sound captured from the surroundings of the vessel.

8. The remote operation centre (100) according to claim 1, wherein the processing unit (122) is further configured to generate, based on the analysis, a visual indicator signal indicating a source object of a sound represented by the at least one microphone signal received.

9. The remote operation centre (100) according to claim 8, wherein the visual indicator signal further indicates a direction of movement of the source object.

10. The remote operation centre (100) according to claim 8, wherein the remote operation centre (100) further comprises a display arrangement (130), and the output unit (123) is further configured to send the visual indicator signal generated to the display arrangement (130).

11. The remote operation centre (100) according to claim 1, wherein the input unit (121) is further configured to receive one or more radio communication channel signals of a vessel radio communication system, and the output unit (123) is further configured to send the one or more radio communication channel signals as directional radio output signals to one or more speakers of the set of speakers (110) such that each radio communication channel is reproduced from a different direction.

12. The remote operation centre (100) according to claim 1, wherein the processing unit (122) is further configured to determine a priority level for each signal to be sent to the one or more speakers of the set of speakers (110) and control the volume of the signals based on the determined priority levels.

13. A sound system (200) for monitoring a vessel (210), comprising an array (211) of on-board directional microphones and the remote operation centre (100) according to claim 11.

14. The sound system (200) according to claim 13, wherein at least a portion of the array (211) of the on-board directional microphones is arranged under the sea level.

15. The sound system (200) according to claim 13, wherein at least a portion of the array (211) of the on-board directional microphones is arranged above the sea level.

16. The sound system (200) according to claim 13, wherein the sound system (200) further comprises a radio communication system (212).

17. The remote operation centre (100) according to claim 2, wherein the processing unit (122) is further configured to perform the analyzing of the received at least one microphone signal by identifying a source object of a sound represented by the received at least one microphone signal.

18. The remote operation centre (100) according to claim 4, wherein the processing unit (122) is communicatively connected to a database comprising identification information on predetermined source objects, and the processing unit (122) is further configured to perform the identifying of the source object by utilizing the identification information.

19. The remote operation centre (100) according to claim 18, wherein the identification information comprises information on at least one of: vessel propulsion types, vessel hull forms, vessel caused wave patterns, vessel engine sounds, or vessel horn sounds.

20. The remote operation centre (100) according to claim 2, wherein a sound represented by the received at least one microphone signal comprises ambient sound captured from the surroundings of the vessel.

\* \* \* \* \*